(12) United States Patent
Zheng

(10) Patent No.: US 8,722,240 B2
(45) Date of Patent: May 13, 2014

(54) SINGLE CELL AND POWER BATTERY PACK COMPRISING THE SAME

(75) Inventor: Weixin Zheng, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 86 days.

(21) Appl. No.: 13/283,644

(22) Filed: Oct. 28, 2011

(65) Prior Publication Data

US 2012/0040218 A1 Feb. 16, 2012
US 2013/0164581 A2 Jun. 27, 2013

Related U.S. Application Data

(63) Continuation of application No. PCT/CN2010/071731, filed on Apr. 13, 2010.

(30) Foreign Application Priority Data

Apr. 30, 2009 (CN) ...................... 2009 2 0131243 U

(51) Int. Cl.
*H01M 2/06* (2006.01)
*H01M 4/00* (2006.01)
*H01M 2/20* (2006.01)
*H01M 2/30* (2006.01)

(52) U.S. Cl.
USPC .......................... 429/179; 29/623.1; 429/158

(58) Field of Classification Search
USPC .................. 429/179, 158; 29/623.1
See application file for complete search history.

(56) References Cited

U.S. PATENT DOCUMENTS

| 6,599,659 B1 | 7/2003 | Endo et al. |
| 2001/0049054 A1* | 12/2001 | Enomoto et al. ............. 429/158 |
| 2004/0224227 A1 | 11/2004 | Ozawa et al. |
| 2008/0076018 A1 | 3/2008 | Wu |
| 2009/0223940 A1 | 9/2009 | Hosoya |
| 2010/0104939 A1 | 4/2010 | Wang et al. |

FOREIGN PATENT DOCUMENTS

| CN | 2605668 Y | 3/2004 |
| CN | 2717037 Y | 8/2005 |
| JP | 2002/305029 A | 10/2002 |
| KR | 10-2006/0118798 A | 11/2006 |

\* cited by examiner

*Primary Examiner* — Ula C Ruddock
*Assistant Examiner* — Frank Chernow
(74) *Attorney, Agent, or Firm* — Finnegan, Henderson, Farabow, Garrett & Dunner, LLP

(57) ABSTRACT

A single cell and a power battery pack comprising the same are provided. The single cell comprises: a shell; a cover board sealing an open end of the shell; an electrode core disposed inside the shell; an electrode terminal extending through the cover board, the electrode terminal comprising a first end portion connected with the electrode core inside the shell, a second end portion protruding outside the shell, and a middle portion between the first end portion and the second end portion; and an insulating member disposed between the electrode terminal and the cover board for insulating the electrode terminal; wherein each of the first end portion and the second end portion comprises a plurality of flexible conductive members.

17 Claims, 3 Drawing Sheets

SINGLE CELL AND POWER BATTERY PACK COMPRISING THE SAME

CROSS-REFERENCE TO RELATED APPLICATIONS

This application is a continuation of International Application No. PCT/CN2010/071731, filed Apr. 13, 2010, which claims priority to Chinese Patent Application No. 200920131243.3, filed on Apr. 30, 2009, the entire contents of which are incorporated herein by reference.

FIELD OF THE INVENTION

The present invention relates to battery and more particularly to a single cell with an improved structure and a power battery pack including the single cell.

BACKGROUND

As batteries are more and more widely used nowadays, demand for enhanced battery performance is growing. High power outputs are required for many equipments, such as an electric vehicle, etc. Conventionally, a plurality of single cells are connected to form a power battery pack. These single cells include positive electrode poles and negative electrode poles connected in parallel and/or in series to form a desired power source with a high power output. However, the connections may cause a high contact resistance, heavy weight, unstable connection, weak sealing problems, etc., which may affect battery safety and output performance.

SUMMARY OF THE INVENTION

According to one embodiment, a single cell with an improved structure and a power battery pack is provided to solve at least one of the problems existing in the conventional battery pack as discussed above. Accordingly, the single cell may overcome the problems in conventional battery packs and provide a safer and more reliable cell. According to a further embodiment, a power battery pack comprising the single cell is provided.

According to an embodiment, a single cell comprises: a shell; a cover board sealing an open end of the shell; an electrode core disposed inside the shell; and an electrode terminal penetrating through the cover board with a first end portion connected with the electrode core inside the shell, a second end portion protruding outside the shell, and a middle portion connected between the first end portion and the second end portion penetrating through the cover board in an insulating manner. The first end portion and the second end portion may be formed by a plurality of flexible conductive members connected together.

According to an embodiment, a power battery pack is provided, comprising a plurality of single cells as described above. The single cells may be connected in parallel, in series, or in parallel and series.

According to a further embodiment, the first end portion of the electrode terminal in the single cell is formed by coiling or overlapping a plurality of layers of flexible conductive sheets, or by combining multiple flexible conductive wires. Thus, relative movements, such as sliding, between the electrical cores may not affect connecting portions in the single cell. Furthermore, vibrations caused by welding and so on may have less impact on the sealing structure of the battery.

Further, the second end portion of the electrode terminal in the single cell is formed by coiling or overlapping a plurality of layers of flexible conductive sheets, or by combining multiple flexible conductive wires. Relative movements, such as sliding, of the cells may have no or limited effects on the connection portions in the single cell, since the end portions with flexible layered or laminated structure may have an enhanced flexibility and buffering performance. Further, as described above, battery movements, such as significant and long-standing vibrations produced during operations of an electric vehicle, may have no or limited effects on the output performance of the power battery pack.

BRIEF DESCRIPTION OF THE DRAWINGS

These and other aspects and advantages of the invention will become apparent and more readily appreciated from the following descriptions taken in conjunction with the drawings in which.

Figure 1:
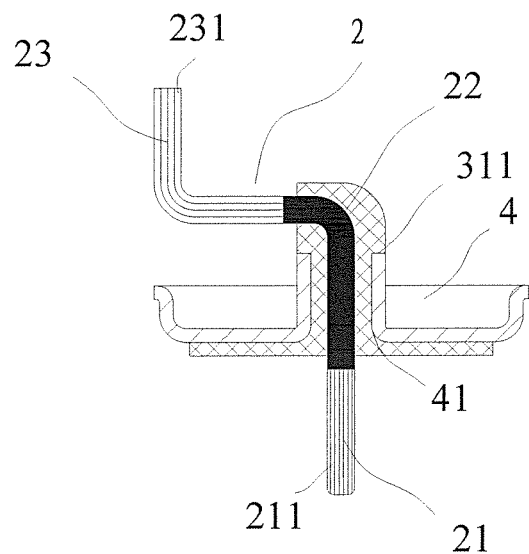
FIG. 1 shows a partial schematic view of a single cell according to an embodiment of the present invention.

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DESCRIPTION OF THE EMBODIMENTS OF THE INVENTION

Reference will be made in detail to embodiments as described herein. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

Figure 2:
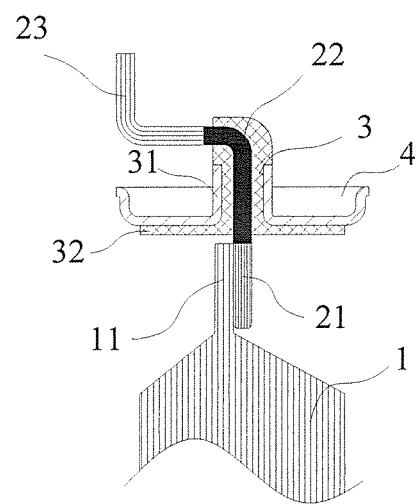
FIG. 2 shows a schematic view of a single cell according to an embodiment of the present invention, where an electrode terminal is connected with a tab in the single cell depicted in FIG. 1.

In the following, the present invention will be described in detail in conjunction with the accompanying drawings. FIG. 1 shows a partial schematic view of a single cell according to an embodiment. FIG. 2 shows a schematic view of a single cell according to another embodiment, where an electrode terminal 2 shown in FIG. 1 is connected with a tab 11 in the single cell.

According to the embodiments shown in FIGS. 1 and 2, a single cell may comprise a shell (not shown), a cover board 4, and an electrode core 1. As shown in FIGS. 1 and 2, the electrode core 1 may be accommodated in the shell. The cover board 4 may be connected with the shell in a sealing or hermetic manner. The cover board 4 may have an electrode terminal 2 penetrating through the cover board 4. The electrode terminal 2 may comprise a first end portion 21 connected with the electrode core 1 inside the shell, a second end portion 23 protruding outside the single cell for leading current, and a middle portion 22 penetrating through the cover board 4. The first end portion 21 may be connected with the tab 11 of the electrode core 1 inside the single cell 6. A sealing component may be set to seal the connection between the electrode terminal 2 and the cover board 4. The first end portion 21 and the second end portion 23 of the electrode terminal 2 may be formed by coiling or overlapping a plurality of layers of flexible conductive sheets 231 and 211, or by combining multiple flexible conductive wires (not shown).

According to an embodiment of the invention, the first end portion 21 and the second end portion 23 of the electrode terminal 2 may be formed by coiling or overlapping a plurality of layers of flexible conductive sheets 231, of which the material may be one or more selected from a group consisting of copper, aluminum, nickel, stainless steel, carbon steel, and nickel steel alloy. The middle portion 22 may be formed by an integral conductive sheet. The first end portion 21, the middle portion 22, and the second end portion 23 of the electrode terminal 2 may be connected in sequence by any methods known in the art. For example, welding, such as laser welding, electronic beam welding, brazing, etc, may be adopted. According to an embodiment of the invention, the first end portion 21, the middle portion 22 and the second end portion 23 of the electrode terminal 2 may be integrally formed, and the electrode terminal 2 may have a thickness of about 0.5-10 mm, a width of about 3-200 mm, and a length of about 3-50 mm, which may be realized by overlapping or coiling a plurality of layers of conductive sheets.

According to some embodiments of the present invention, the middle portion 22 may be formed by an integral metal sheet comprising a plurality of layers of sheets. The plurality of layers of sheets may be sealed with each other by one or more of the following methods: hot pressing, cold pressing, composite and diffusing. According to an embodiment of the invention, a hard metal block may be adopted. Further, the number of the layers is not limited according to the present invention, and it may be adjusted according to the current, toughness, etc.

The thickness of the conductive sheet may be adjusted according to practical requirements. According to an embodiment of the present invention, it may be 0.5-3 mm. Meanwhile, according to an embodiment of the invention, to ensure better connection with the tab 11, the thickness of the first end portion 21 of the electrode terminal 2 may be 0.5-1 time of a total thickness of the positive tab and the negative tab.

According to an embodiment of the present invention, the electrode terminal 2 and the cover board 4 may be integrally formed. The cover board 4 may have a via hole 41 formed thereon. The electrode terminal 2 may penetrate through the via hole 41. A hollow rivet 31 and an insulating sealing member 32 may be provided between the electrode terminal 2 and a side wall of the via hole 41 so that the electrode terminal 2 is fixed therein. The hollow rivet 31 may be integrally formed on the cover board 4. And the insulating sealing member 32 may be disposed within the hollow rivet 31, tightly wrapping around an open end 311 of the hollow rivet 31. The hollow rivet 31 may hold and press the insulating sealing member 32 to cause elastic or plastic deformation to tightly seal the electrode terminal 2. The material for the insulating sealing member 32 may be any kind of insulating sealing material known in the art. For example, it may be any material that may be insulating, organic solvent-resistant, Hydrofluoric (HF) acid-resistant, such as plastic, rubber, resin, glass, or ceramic, which can be attached to metal such as copper, aluminum, stainless steel, or other materials. And the insulating sealing member 32 may be prepared according to method known in the art such as injection molding or other methods.

The electrode core 1 may be formed by a positive plate, a negative plate, and a separator provided between the positive and negative plates, which are coiled together with a positive tab and a negative tab protruding, respectively, from the positive plate and the negative plate in opposite directions.

The positive plate and negative plate may each have a dressed area and an undressed area. Active material may be coated on the dressed area whereas the undressed area may be reserved. Further, the undressed area may be formed by scratching an end of the positive or negative plate that may be parallel with the length direction of the plate. The active material may be any positive or negative material known in the art. The dressing method/scratching process as well as the preparation method for the electrode plates may be any method known in the art.

According to an embodiment of the present invention, the electrode core 1 may be formed by coiling the positive plate and the negative plate with a separator disposed between the plates. To further improve the battery safety performance, according to an embodiment of the invention, the outer layer of the electrode core 1 may be the separator layer. The positive and negative tabs may be those known in the art. One or more tabs may be welded on the positive plate and the negative plate, respectively. According to an embodiment of the invention, the positive tab and the negative tab may be formed by coiling and compressing the undressed area. The tabs may extend from both ends of the electrode core 1, or may extend from one end of the electrode core 1.

According to an embodiment of the present invention, the positive tab and the negative tab may be placed in opposite directions, and may extend out of the separator provided between the positive plate and the negative plate. According to an embodiment of the present invention, the thickness of the tab may be about 0.5-10 mm, and the width may be about 3-200 mm.

According to a further embodiment, a power battery pack is provided, comprising a plurality of the above-described single cells. The plurality of single cells may be connected in parallel, in series, or first in parallel and the parallel-connected single cells connected in series. The connection in series or in parallel and series may be realized by connecting the second end portions 23 of the electrode terminals 2 of the single cells.

According to an embodiment of the present invention, the connection between the first end portions 21 of the electrical terminals 2 and the connections between the positive and negative tabs and the second end portions 23 may be realized by welding, such as ultrasonic welding, laser welding, brazing, flash welding, friction welding, resistance welding, or other methods.

Figure 3:
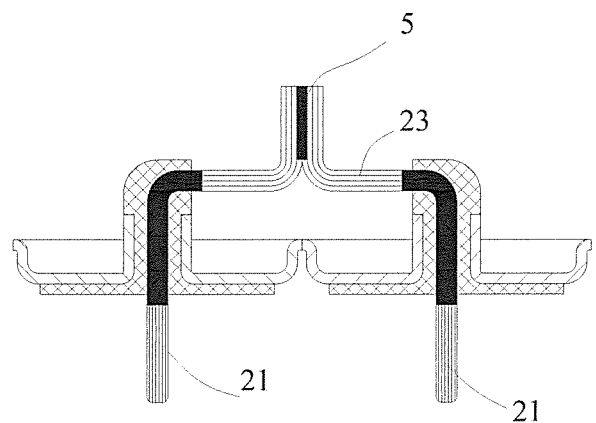
FIG. 3 shows a schematic view of a connecting structure between electrode terminals of single cells according to an embodiment of the present invention.

FIG. 3 shows a schematic view of a connecting structure between the electrode terminals 2 of the single cells. The metal sheets 231 (shown in FIG. 1) of the second end portions 23 of electrode terminals 2 of two single cells may be attached and welded, thus connecting the two single cells in parallel or in series.

Figure 4:
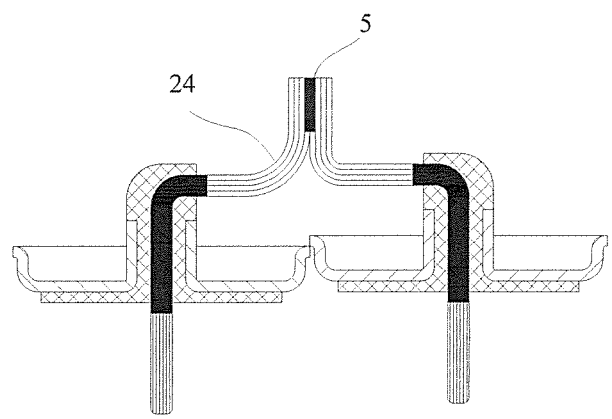
FIG. 4 shows a schematic view of FIG. 3, where the electrode terminals slide with each other.

FIG. 4 shows the connection between electrode terminals 2, when there are relative sliding motions between the single cells. As shown in FIG. 4, the metal sheets of the second end portion 23 of the electrode terminal 2 may have a flexible buffering property, forming a buffering portion 24 when the single cells move or slide with respect to each other. The buffering portion 24 may reduce or eliminate the influence on the connection portion 5 by the stress due to the relative movement between the single cells. Also, the metal foil or sheet structure at the ends of the electrode terminal 2 further reduces the influence on an insulating sealing portion 3 (shown in FIG. 2) due to the relative movements that may cause loosening of the electrode terminal 2 from the insulating sealing portion 3, thereby stabilizing the power battery pack.

Figure 5:
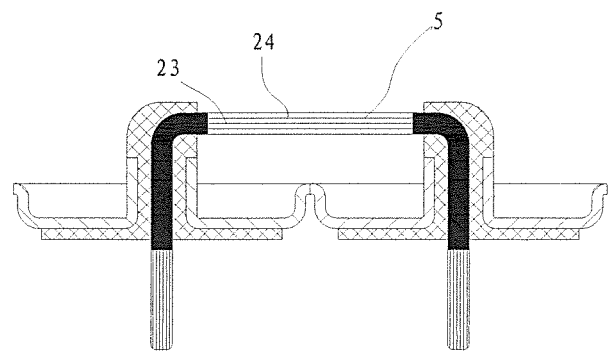
FIG. 5 is a schematic view of a connecting structure between electrode terminals of single cells according to another embodiment of the present invention.

FIG. 5 shows a connection between the electrode terminals 2 (shown in FIG. 2) of the single cells according to another embodiment, where the electrode terminal 2 of each single cells has a bent shape. The second end portions 23 of the electrode terminals 2 may be end-to-end connected with each other via laser welding, thus forming a connecting portion 5. The two single cells may be connected in series or in parallel. When there are relative sliding movements between cells, the connecting portion 5 provides a buffering portion 24, which prevents damages to the cells.

As described above, because the first end portion 21 of the electrode terminal 2 in the single cell are formed by coiling or overlapping a plurality of layers of flexible conductive sheets, or by combining multiple flexible conductive wires, relative movements, such as sliding, between the electrical cores 2 may not affect the connecting portions in the single cells. Furthermore, the flexibility of the connection may reduce the impact on the sealing structure of the single cell due to vibrations caused by welding and so on.

Further, as described above, the second end portion 23 of the electrode terminal 2 in the single cell is formed by coiling or overlapping a plurality of layers of flexible conductive sheets, or by combining multiple flexible conductive wires. Thus, relative movements, such as relative sliding, of the cells may have no or limited effects on the connecting portions in the single cells, due to the enhanced flexibility and buffering performance of the end portions having the flexible layers or laminated structure described above.

As shown in FIGS. 3-5, the electrical terminals of neighboring single cells may be butt jointed (FIGS. 3-4) or end-to-end connected by laser welding (FIG. 5).

Figure 6:
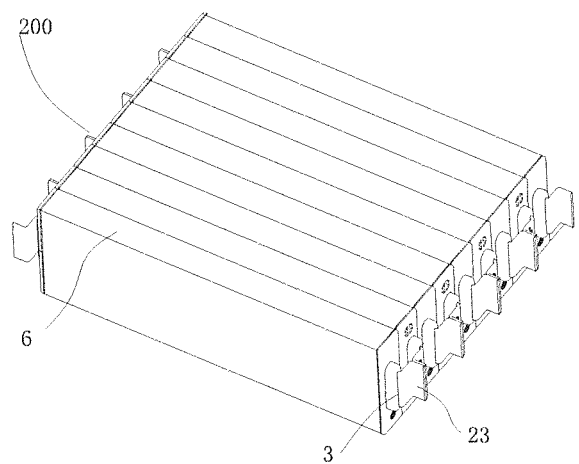
FIG. 6 shows a perspective view of a power battery pack according to an embodiment of the invention.

FIG. 6 shows a perspective view of the power battery pack 200 according to another embodiment. The power battery pack 200 comprises a plurality of single cells 6. As shown in FIGS. 1 and 2, each single cell 6 comprises a shell, an electrode core 1 disposed in the shell, and a cover board assembly for connecting and sealing the shell. The cover board assembly may comprise a cover board 4, an electrode terminal 2 penetrating through the cover board 4, and an insulating portion 3 for sealing and insulation. The plurality of single cells 6 may form the power battery pack 200 by connecting the second portion 23 of the electrode terminals 2 in parallel and/or in series, as described above. As described above, the physical movements of the battery pack 200 may have no or limited effects on the output performance. The battery pack 200 may have enhanced performance when installed on vehicles, such as an electric vehicle, which have long-standing and significant vibrations during the operation of the vehicles.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A single battery cell, comprising:
   a shell;
   a cover board sealing an open end of the shell;
   an electrode core disposed inside the shell;
   an electrode terminal extending through the cover board, the electrode terminal comprising a first end portion connected with the electrode core inside the shell, a second end portion protruding outside the shell, and a middle portion connected between the first end portion and the second end portion; and
   an insulating member disposed between the electrode terminal and the cover board for insulating the electrode terminal; wherein
   each of the first end portion and the second end portion comprises a plurality of discrete flexible conductive members combined together,
   wherein the cover board comprises a via hole,
   wherein the single battery cell further comprises a rivet at least partially disposed within the via hole and covering an inner surface of the via hole,
   wherein a portion of the electrode terminal penetrates through a space defined by the rivet at least partially disposed within the via hole, and
   wherein at least a portion of the insulating member is disposed within the space defined by the rivet and surrounding the portion of the electrode terminal penetrating through the space defined by the rivet.

2. The single cell according to claim 1, wherein the discrete conductive members combined together include discrete conductive sheets or wires combined together.

3. The single cell according to claim 2, wherein the discrete conductive sheets combined together are coiled or overlapped together.

4. The single cell according to claim 1, wherein the middle portion includes an integral conductive sheet.

5. The single cell according to claim 4, wherein the integral conductive sheet includes a plurality of layers of conductive sheets insulated from each other.

6. The single cell according to claim 1, wherein the first end portion, the middle portion, and the second end portion of the electrode terminal are integrated together, and the electrode terminal has a thickness of substantially 0.5-10 mm, a width of substantially 3-200 mm, and a length of substantially 3-50 mm.

7. The single cell according to claim 1, wherein the electrode core is formed by a positive plate, a negative plate, and a separator between the positive plate and the negative plate, the positive plate, the negative plate, and the separator are coiled together, and a positive tab and a negative tab protrude from the positive plate and the negative plate in opposite directions.

8. The single cell according to claim 7, wherein the first end portion is 0.5 to 1 time as thick as the positive tab and the negative tab.

9. A power battery pack comprising:
   a plurality of single cells connected in parallel, in series, or in parallel and the parallel-connected single cells connected in series, wherein
   each of the single cells comprises:
   a shell;
   a cover board sealing an open end of the shell;
   an electrode core disposed inside the shell;
   an electrode terminal extending through the cover board, the electrode terminal comprising a first end portion connected with the electrode core inside the shell, a second end portion protruding outside the shell, and a middle portion between the first end portion and the second end portion; and
   an insulating member disposed between the electrode terminal and the cover board for insulating the electrode terminal; wherein each of the first end portion and the second end portion comprises a plurality of discrete flexible conductive members combined together, wherein the cover board comprises a via hole, wherein each of the single battery cells further comprises a rivet at least partially disposed within the via hole and covering an inner surface of the via hole, wherein a portion of the electrode terminal penetrates through a space defined by the rivet at least partially disposed within the via hole, and wherein at least a portion of the insulating member is disposed within the space defined by the rivet and surrounding the portion of the electrode terminal penetrating through the space defined by the rivet.

10. The power battery pack according to claim 9, wherein the electrical terminals of neighboring single cells are butt jointed or end-to-end connected by welding.

11. A method for manufacturing a single battery cell, comprising:
providing a shell having an open end;
covering the open end of the shell by a cover board;
disposing an electrode core inside the shell;
disposing an electrode terminal through the cover board comprising a via hole;
disposing a rivet at least partially within the via hole and covering an inner surface of the via hole,
wherein a portion of the electrode terminal penetrates through a space defined by the rivet at least partially disposed within the via hole,
wherein at least a portion of the insulating member is disposed within the space defined by the rivet and surrounding the portion of the electrode terminal penetrating through the space defined by the rivet,
connecting a first end portion of the electrode terminal to the electrode core, wherein a second end portion of the electrode terminal protrudes outside the shell and each of the first end portion and the second end portion comprises a plurality of discrete flexible conductive members combined together; and
insulating the electrode terminal by an insulating member disposed between the electrode terminal and the cover board.

12. The method of claim 11, wherein the discrete conductive members combined together include discrete conductive sheets or wires combined together.

13. The method of claim 12, further comprising coiling the discrete conductive sheets together.

14. The method of claim 13, further comprising insulating the discrete conductive sheets from each other.

15. The method of claim 12, further comprising combining the discrete conductive wires together.

16. The method of claim 11, further comprising:
wrapping an insulating seal around the electrode terminal; and
pressing the rivet on the insulating seal.

17. The method of claim 11, further comprising forming the electrode core using a positive plate, a negative plate, and a separator between the positive pate and the negative plate, wherein the positive plate, the negative plate, and the separator are coiled together, and a positive tab and a negative tab protrude from the positive plate and the negative plate in opposite directions.

* * * * *